US012603373B2

(12) United States Patent　(10) Patent No.: US 12,603,373 B2
Maguire et al.　(45) Date of Patent: Apr. 14, 2026

(54) TRACTION BATTERY PACK ASSEMBLING METHOD

(71) Applicant: Ford Global Technologies, LLC, Dearborn, MI (US)

(72) Inventors: Patrick Daniel Maguire, Ann Arbor, MI (US); Marc Dugas, Wixom, MI (US); Jason C. Marcath, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 866 days.

(21) Appl. No.: 17/870,210

(22) Filed: Jul. 21, 2022

(65) Prior Publication Data

US 2023/0307762 A1　Sep. 28, 2023

Related U.S. Application Data

(60) Provisional application No. 63/322,766, filed on Mar. 23, 2022.

(51) Int. Cl.
*H01M 50/249* (2021.01)
*H01M 50/209* (2021.01)

(52) U.S. Cl.
CPC ....... *H01M 50/249* (2021.01); *H01M 50/209* (2021.01); *H01M 2220/20* (2013.01)

(58) Field of Classification Search
CPC ............. H01M 50/249; H01M 50/209; H01M 2220/20; Y02E 60/10
See application file for complete search history.

(56) References Cited

U.S. PATENT DOCUMENTS

| | | | |
|---|---|---|---|
| 8,089,248 B2 | 1/2012 | Tabatowski-Bush | |
| 8,968,912 B2 | 3/2015 | Maguire et al. | |
| 9,217,781 B2 | 12/2015 | Tabatowski-Bush et al. | |
| 9,425,628 B2 | 8/2016 | Pham et al. | |
| 9,446,680 B2 | 9/2016 | Chen et al. | |
| 9,515,357 B2 | 12/2016 | Haskins et al. | |
| 9,583,747 B2 | 2/2017 | Baek et al. | |
| 9,774,056 B2 | 9/2017 | Hood | |

(Continued)

FOREIGN PATENT DOCUMENTS

| | | |
|---|---|---|
| CN | 101860053 A | 10/2010 |
| CN | 101860053 B | 4/2015 |

(Continued)

OTHER PUBLICATIONS

CN 111606033 machine English translation (Year: 2020).*

(Continued)

*Primary Examiner* — Michael L Dignan
(74) *Attorney, Agent, or Firm* — David B. Kelley; Carlson, Gaskey & Olds, P.C.

(57) ABSTRACT

A battery pack assembly method includes holding a cell stack with a compression machine. The compression machine engages a first load plate at a first end of the cell stack and a second load plate at an opposite, second end of the cell stack during the holding. The method further includes aligning the cell stack relative to an enclosure structure while the compression machine holds the cell stack, inserting the cell stack into a cell-receiving opening of an enclosure structure, and disengaging the compression machine from the first load plate and the second load plate.

13 Claims, 4 Drawing Sheets

(56) References Cited

U.S. PATENT DOCUMENTS

| | | | |
|---|---|---|---|
| 9,799,932 | B2 | 10/2017 | Haskins et al. |
| 10,109,897 | B2 | 10/2018 | Haskins et al. |
| 10,566,647 | B2 | 2/2020 | Andryukov et al. |
| 10,601,006 | B2 | 3/2020 | Maguire et al. |
| 10,608,222 | B2 | 3/2020 | Montgomery et al. |
| 10,759,281 | B2 | 9/2020 | Miller et al. |
| 10,784,495 | B2 | 9/2020 | Fernandez-Galindo et al. |
| 11,005,131 | B2 | 5/2021 | Zhou et al. |
| 11,024,913 | B2 | 6/2021 | Subramanian et al. |
| 11,050,125 | B1 | 6/2021 | Zhu et al. |
| 11,114,726 | B2 | 9/2021 | Gu et al. |
| 11,128,009 | B2 | 9/2021 | Chen et al. |
| 11,139,537 | B2 | 10/2021 | Wu et al. |
| 11,217,847 | B2 | 1/2022 | Eftekhari et al. |
| 11,258,119 | B2 | 2/2022 | Wang et al. |
| 11,264,669 | B2 | 3/2022 | Jiang |
| 11,283,130 | B2 | 3/2022 | Chen et al. |
| 11,289,750 | B2 | 3/2022 | Zhou et al. |
| 11,302,972 | B2 | 4/2022 | Chu et al. |
| 11,302,973 | B2 | 4/2022 | Maguire et al. |
| 11,302,990 | B2 | 4/2022 | Huang et al. |
| 11,329,347 | B2 | 5/2022 | Huang et al. |
| 11,335,960 | B2 | 5/2022 | Wang et al. |
| 11,362,392 | B2 | 6/2022 | Wang et al. |
| 11,362,393 | B2 | 6/2022 | Wang et al. |
| 11,387,519 | B2 | 7/2022 | Huang et al. |
| 11,404,744 | B1 | 8/2022 | Yang et al. |
| 11,417,932 | B2 | 8/2022 | Tang et al. |
| 11,417,936 | B2 | 8/2022 | Wang et al. |
| 2006/0093890 | A1 | 5/2006 | Steinbroner |
| 2010/0259221 | A1 | 10/2010 | Tabatowski-Bush |
| 2013/0164592 | A1 | 6/2013 | Maguire et al. |
| 2013/0218331 | A1* | 8/2013 | Nammoto ............... B25J 9/1643 |
| | | | 700/245 |
| 2013/0345866 | A1* | 12/2013 | Tanaka ................... B25J 9/1664 |
| | | | 700/250 |
| 2016/0344061 | A1* | 11/2016 | Maguire ............. H01M 10/613 |
| 2017/0104251 | A1 | 4/2017 | Wang |
| 2019/0165408 | A1* | 5/2019 | Andryukov ......... H01M 50/293 |
| 2019/0305389 | A1 | 10/2019 | Poirier et al. |
| 2020/0091494 | A1 | 3/2020 | Fernandez-Galindo et al. |
| 2020/0203684 | A1 | 6/2020 | Chen et al. |
| 2020/0203779 | A1 | 6/2020 | Wang et al. |
| 2020/0212387 | A1 | 7/2020 | Su et al. |
| 2020/0212397 | A1 | 7/2020 | Wang et al. |
| 2020/0212418 | A1 | 7/2020 | Chen et al. |
| 2020/0346555 | A1* | 11/2020 | Bernhardt .............. B64U 20/50 |
| 2020/0381697 | A1 | 12/2020 | Fernandez-Galindo et al. |
| 2021/0066686 | A1 | 3/2021 | Siewert et al. |
| 2021/0091348 | A1 | 3/2021 | Lateef et al. |
| 2021/0091437 | A1 | 3/2021 | Chen et al. |
| 2021/0104798 | A1 | 4/2021 | Jiang et al. |
| 2021/0119279 | A1 | 4/2021 | Wang et al. |
| 2021/0218117 | A1 | 7/2021 | Zhu et al. |
| 2021/0229541 | A1 | 7/2021 | Smith et al. |
| 2021/0305641 | A1 | 9/2021 | Bai et al. |
| 2021/0305642 | A1 | 9/2021 | Bai et al. |
| 2021/0320349 | A1 | 10/2021 | Jiang et al. |
| 2021/0320372 | A1 | 10/2021 | Jiang et al. |
| 2021/0402863 | A1 | 12/2021 | Huang et al. |
| 2021/0408634 | A1 | 12/2021 | Yin et al. |
| 2022/0052414 | A1 | 2/2022 | Huang et al. |
| 2022/0052415 | A1 | 2/2022 | Huang et al. |
| 2022/0059897 | A1 | 2/2022 | Huang et al. |
| 2022/0059902 | A1 | 2/2022 | Jiang et al. |
| 2022/0077521 | A1 | 3/2022 | Jin et al. |
| 2022/0085450 | A1 | 3/2022 | Chu et al. |
| 2022/0102800 | A1 | 3/2022 | Wang et al. |
| 2022/0109211 | A1 | 4/2022 | Wang et al. |
| 2022/0123394 | A1 | 4/2022 | Zhang et al. |
| 2022/0123423 | A1 | 4/2022 | Wang et al. |
| 2022/0149458 | A1 | 5/2022 | Jiang et al. |
| 2022/0158296 | A1 | 5/2022 | Chen et al. |
| 2022/0185088 | A1 | 6/2022 | Zhang et al. |
| 2022/0190416 | A1 | 6/2022 | Wu |
| 2022/0190423 | A1 | 6/2022 | Wu et al. |
| 2022/0216555 | A1 | 7/2022 | Huang et al. |
| 2022/0221084 | A1 | 7/2022 | Huang et al. |
| 2022/0231370 | A1 | 7/2022 | Yang et al. |
| 2022/0231371 | A1 | 7/2022 | Jiang et al. |
| 2022/0255172 | A1 | 8/2022 | Guo et al. |

FOREIGN PATENT DOCUMENTS

| | | | | | |
|---|---|---|---|---|---|
| CN | 107757374 | A | 3/2018 | | |
| CN | 208738329 | U | 4/2019 | | |
| CN | 209016158 | U | 6/2019 | | |
| CN | 209045657 | U | 6/2019 | | |
| CN | 110048042 | A | 7/2019 | | |
| CN | 209071465 | U | 7/2019 | | |
| CN | 209104196 | U | 7/2019 | | |
| CN | 209104221 | U | 7/2019 | | |
| CN | 209104222 | U | 7/2019 | | |
| CN | 209104228 | U | 7/2019 | | |
| CN | 209104229 | U | 7/2019 | | |
| CN | 209104230 | U | 7/2019 | | |
| CN | 209104232 | U | 7/2019 | | |
| CN | 209104234 | U | 7/2019 | | |
| CN | 209104235 | U | 7/2019 | | |
| CN | 209104236 | U | 7/2019 | | |
| CN | 209104237 | U | 7/2019 | | |
| CN | 209104238 | U | 7/2019 | | |
| CN | 209104242 | U | 7/2019 | | |
| CN | 209104331 | U | 7/2019 | | |
| CN | 209183581 | U | 7/2019 | | |
| CN | 209183604 | U | 7/2019 | | |
| CN | 209183605 | U | 7/2019 | | |
| CN | 209183611 | U | 7/2019 | | |
| CN | 209183612 | U | 7/2019 | | |
| CN | 209183614 | U | 7/2019 | | |
| CN | 209249637 | U | 8/2019 | | |
| CN | 209357799 | U | 9/2019 | | |
| CN | 209401679 | U | 9/2019 | | |
| CN | 209401680 | U | 9/2019 | | |
| CN | 209401682 | U | 9/2019 | | |
| CN | 209401684 | U | 9/2019 | | |
| CN | 209401715 | U | 9/2019 | | |
| CN | 209447908 | U | 9/2019 | | |
| CN | 110350256 | A | 10/2019 | | |
| CN | 110416448 | A | 11/2019 | | |
| CN | 209592271 | U | 11/2019 | | |
| CN | 209607884 | U | 11/2019 | | |
| CN | 209641720 | U | 11/2019 | | |
| CN | 209710493 | U | 11/2019 | | |
| CN | 110534786 | A | 12/2019 | | |
| CN | 209730104 | U | 12/2019 | | |
| CN | 209747621 | U | 12/2019 | | |
| CN | 209787546 | U | 12/2019 | | |
| CN | 209843820 | U | 12/2019 | | |
| CN | 209936788 | U | 1/2020 | | |
| CN | 110931700 | A | 3/2020 | | |
| CN | 210136922 | U | 3/2020 | | |
| CN | 210136943 | U | 3/2020 | | |
| CN | 210182435 | U | 3/2020 | | |
| CN | 210566905 | U | 5/2020 | | |
| CN | 111354885 | A | 6/2020 | | |
| CN | 210744037 | U | 6/2020 | | |
| CN | 211164003 | | * 8/2020 | .............. | B25J 15/02 |
| CN | 111606033 | | * 9/2020 | ............. | B65G 47/90 |
| CN | 111384314 | B | 1/2021 | | |
| CN | 212311337 | | * 1/2021 | .............. | B23P 19/00 |
| CN | 111384325 | B | 2/2021 | | |
| CN | 112310525 | A | 2/2021 | | |
| CN | 112331982 | A | 2/2021 | | |
| CN | 109742281 | B | 5/2021 | | |
| CN | 111354987 | B | 5/2021 | | |
| CN | 111384337 | B | 5/2021 | | |
| CN | 112331981 | B | 9/2021 | | |
| CN | 112331997 | B | 11/2021 | | |
| CN | 113871789 | A | 12/2021 | | |
| CN | 112310541 | B | 3/2022 | | |
| CN | 216054919 | U | 3/2022 | | |
| CN | 216120549 | U | 3/2022 | | |
| CN | 216120659 | U | 3/2022 | | |

(56) References Cited

FOREIGN PATENT DOCUMENTS

| | | | |
|---|---|---|---|
| CN | 216213898 | U | 4/2022 |
| CN | 216354437 | U | 4/2022 |
| CN | 216354439 | U | 4/2022 |
| CN | 111430826 | B | 6/2022 |
| CN | 216720168 | U | 6/2022 |
| CN | 216720172 | U | 6/2022 |
| CN | 216750072 | U | 6/2022 |
| CN | 216750142 | U | 6/2022 |
| CN | 216872085 | U | 7/2022 |
| CN | 216903107 | U | 7/2022 |
| CN | 216903128 | U | 7/2022 |
| CN | 216903497 | U | 7/2022 |
| DE | 102016119118 | A1 | 4/2017 |
| DE | 102017121796 | A1 | 3/2018 |
| DE | 102019108631 | A1 | 10/2019 |
| DE | 102019125140 | A1 | 3/2020 |
| DE | 102020124986 | A1 | 3/2021 |
| DE | 102021101385 | A1 | 9/2021 |
| EP | 3671904 | A1 | 6/2020 |
| EP | 3671940 | A1 | 6/2020 |
| EP | 3672377 | A1 | 6/2020 |
| EP | 3675204 | A1 | 7/2020 |
| EP | 3675207 | A1 | 7/2020 |
| EP | 3675216 | B1 | 7/2020 |
| EP | 3675217 | A1 | 7/2020 |
| EP | 3675220 | A1 | 7/2020 |
| EP | 3675221 | A1 | 7/2020 |
| EP | 3675236 | A1 | 7/2020 |
| EP | 3675271 | A1 | 7/2020 |
| EP | 3798491 | A1 | 3/2021 |
| EP | 3799150 | A1 | 3/2021 |
| EP | 3799151 | A1 | 3/2021 |
| EP | 3905366 | A1 | 3/2021 |
| EP | 3806231 | A1 | 4/2021 |
| EP | 3852187 | A1 | 7/2021 |
| EP | 3920255 | A1 | 8/2021 |
| EP | 3883005 | A1 | 9/2021 |
| EP | 3883006 | A1 | 9/2021 |
| EP | 3883042 | A1 | 9/2021 |
| EP | 3886198 | A1 | 9/2021 |
| EP | 3886200 | A1 | 9/2021 |
| EP | 3886201 | A1 | 9/2021 |
| EP | 3671893 | B1 | 11/2021 |
| EP | 3699979 | B1 | 11/2021 |
| EP | 3920315 | A1 | 12/2021 |
| EP | 3930027 | A1 | 12/2021 |
| EP | 3944397 | A1 | 1/2022 |
| EP | 3944398 | A1 | 1/2022 |
| EP | 3955333 | A1 | 2/2022 |
| EP | 3799194 | B1 | 3/2022 |
| EP | 3985787 | A1 | 4/2022 |
| EP | 3799153 | B1 | 6/2022 |
| JP | 2010246372 | A | 10/2010 |
| KR | 1020100112530 | A | 10/2010 |
| KR | 101695641 | B1 | 1/2017 |
| KR | 10-2019-0108380 | * | 9/2019 ............. H01M 2/10 |

OTHER PUBLICATIONS

KR 10-2019-0108380 machine English translation (Year: 2019).*
CN 212311337 machine English translation (Year: 2021).*
CN 211164003 machine English translation (Year: 2020).*

* cited by examiner

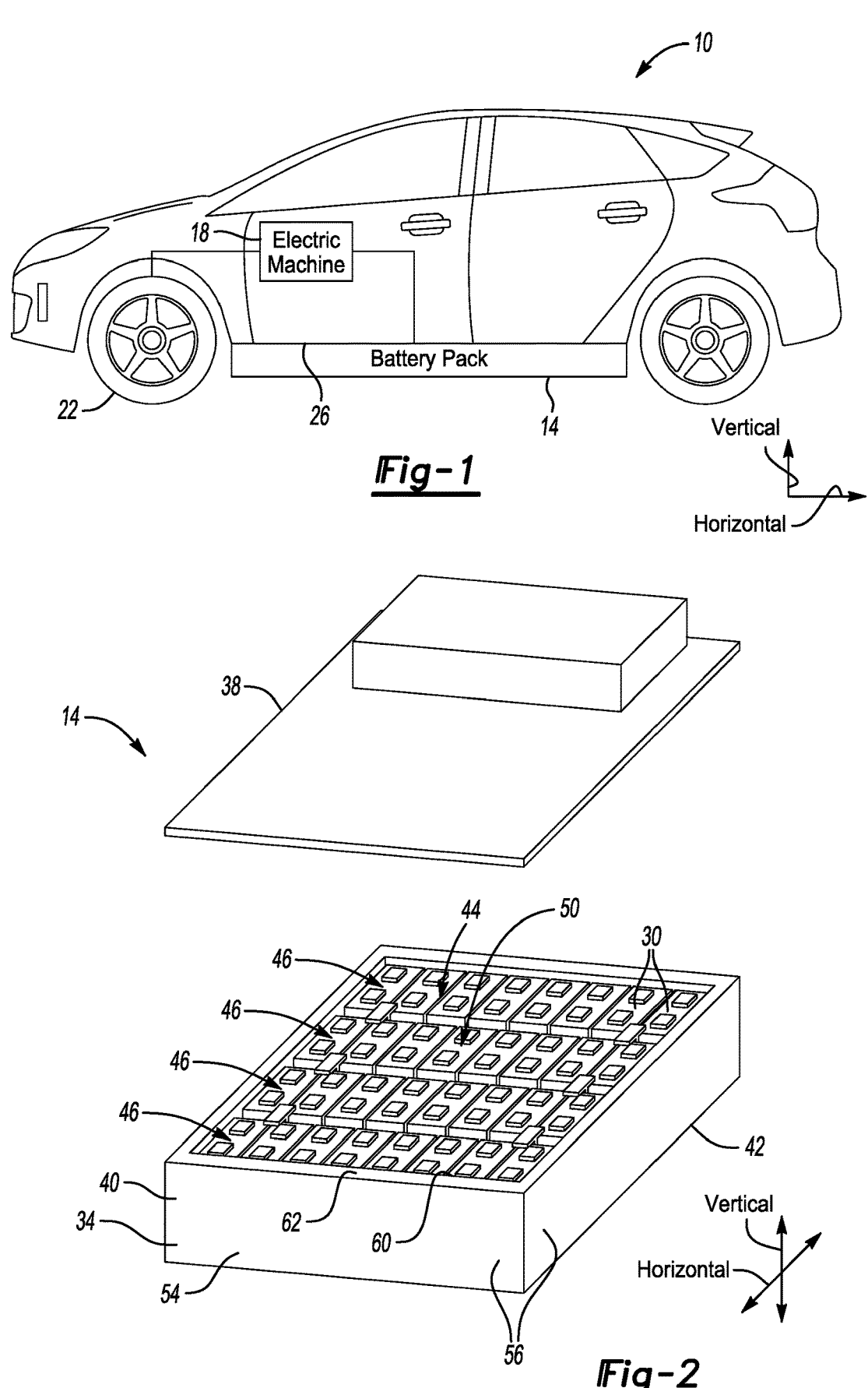
_Fig-1_
_Fig-2_

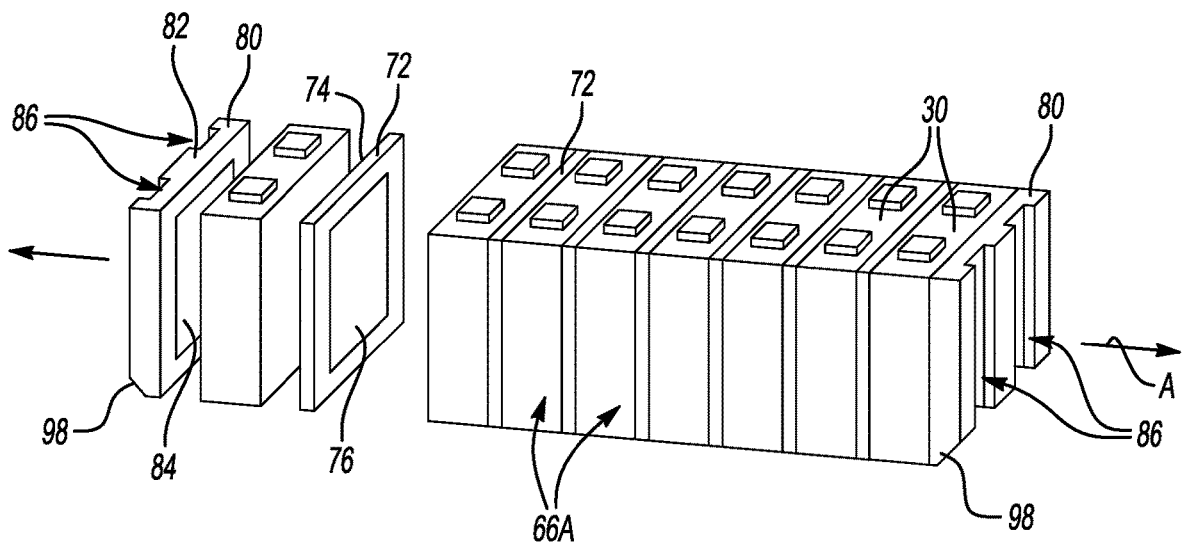
_Fig-3_
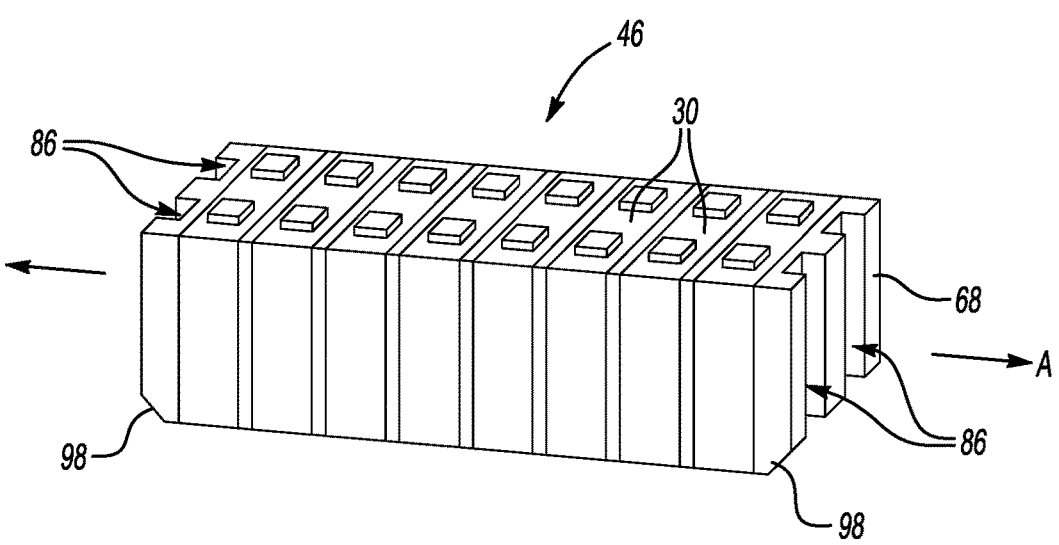
_Fig-4_

TRACTION BATTERY PACK ASSEMBLING METHOD

CROSS-REFERENCE TO RELATED APPLICATIONS

This application claims priority to U.S. Provisional Application No. 63/322,766, which was filed on 23 Mar. 2022 and is incorporated herein by reference

TECHNICAL FIELD

This disclosure relates generally to a method of assembling a traction battery pack and, more particularly, to how cell stacks are moved into an enclosure of the battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a battery pack assembly method, including: holding a cell stack with a compression machine, the compression machine engaging a first load plate at a first end of the cell stack and a second load plate at an opposite, second end of the cell stack during the holding; aligning the cell stack relative to an enclosure structure while the compression machine holds the cell stack; and inserting the cell stack into a cell-receiving opening of an enclosure structure; and disengaging the compression machine from the first load plate and the second load plate.

In some aspects, the techniques described herein relate to a method, wherein the disengaging is after the inserting.

In some aspects, the techniques described herein relate to a method, wherein the compressing machine engages the first load plate through at least one first prong received within a cell stack slot of the first load plate, and engages the second load plate through at least one second prong received within a cell stack slot of the second load plate.

In some aspects, the techniques described herein relate to a method, wherein the at least one first prong includes at least two first prongs, each first prong received within a respective slot of the first load plate, wherein the at least one second prong includes at least two second prongs, each second prong received within a respective slot of the second load plate.

In some aspects, the techniques described herein relate to a method, wherein the enclosure structure includes at least one first clearance groove and at least one second clearance groove, the at least one first clearance groove receiving the at least one first prong during the disengaging, the at least one second clearance groove receiving the at least one second prong during the disengaging.

In some aspects, the techniques described herein relate to a method further including disengaging by moving the at least one first prong and the at least one second prong away from each other into the respective at least one first clearance groove or at least one second clearance groove.

In some aspects, the techniques described herein relate to a method, further including withdrawing the at least one first prong from the at least one first clearance groove, withdrawing the at least one second prong from the at least one second clearance groove, and then introducing an adhesive into the at least one first clearance groove and into the at least one second clearance groove.

In some aspects, the techniques described herein relate to a method, wherein the cell stack is compressed along a cell stack axis during the holding.

In some aspects, the techniques described herein relate to a method, wherein the inserting moves the first cell stack relative to the enclosure structure in a direction that is perpendicular to the cell stack axis.

In some aspects, the techniques described herein relate to a method, further including after the inserting compressing the cell stack with the enclosure structure.

In some aspects, the techniques described herein relate to a method, wherein the enclosure structure circumferentially surrounds the cell stack after the inserting.

In some aspects, the techniques described herein relate to a method, wherein the enclosure structure is an enclosure halo.

In some aspects, the techniques described herein relate to a method, wherein the compressing machine is a 7-axis compression device.

In some aspects, the techniques described herein relate to a traction battery pack assembly, including: a cell stack disposed along a cell stack axis; an enclosure structure that holds the cell stack within a cell-receiving opening and compresses the cell stack along the respective cell stack axis; and at least one load plate of the cell stack, the at least one load plate having at least one cell stack slot that receives a prong of a compressing machine when the cell stack is loaded into the cell-receiving opening.

In some aspects, the techniques described herein relate to a traction battery pack assembly, further including adhesive within the at least one cell stack slot.

In some aspects, the techniques described herein relate to a traction battery pack assembly, the enclosure structure including a clearance groove configured to receives the prong of the compression machine when the prong is withdrawn from the enclosure structure.

In some aspects, the techniques described herein relate to a traction battery pack assembly, wherein the load plate has a chamfered leading edge.

In some aspects, the techniques described herein relate to a traction battery pack assembly, wherein the enclosure structure is an enclosure tray.

In some aspects, the techniques described herein relate to a traction battery pack assembly, wherein the at least one load plate includes a first load plate at a first axial end of the cell stack and a second load plate at an opposite second axial end of the cell stack.

In some aspects, the techniques described herein relate to a traction battery pack assembly, wherein the first load plate and the second load plate directly contact the enclosure structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a side view of an electrified vehicle.

FIG. 2 illustrates a partially expanded view of a traction battery pack from the electrified vehicle of FIG. 1.

FIG. 3 illustrates a group of cells being compressed to provide a cell stack for the traction battery pack of FIG. 2.

FIG. 4 illustrates the group of cells of FIG. 4 compressed and providing the cell stack.

DETAILED DESCRIPTION

Figures 5, 6, 7:
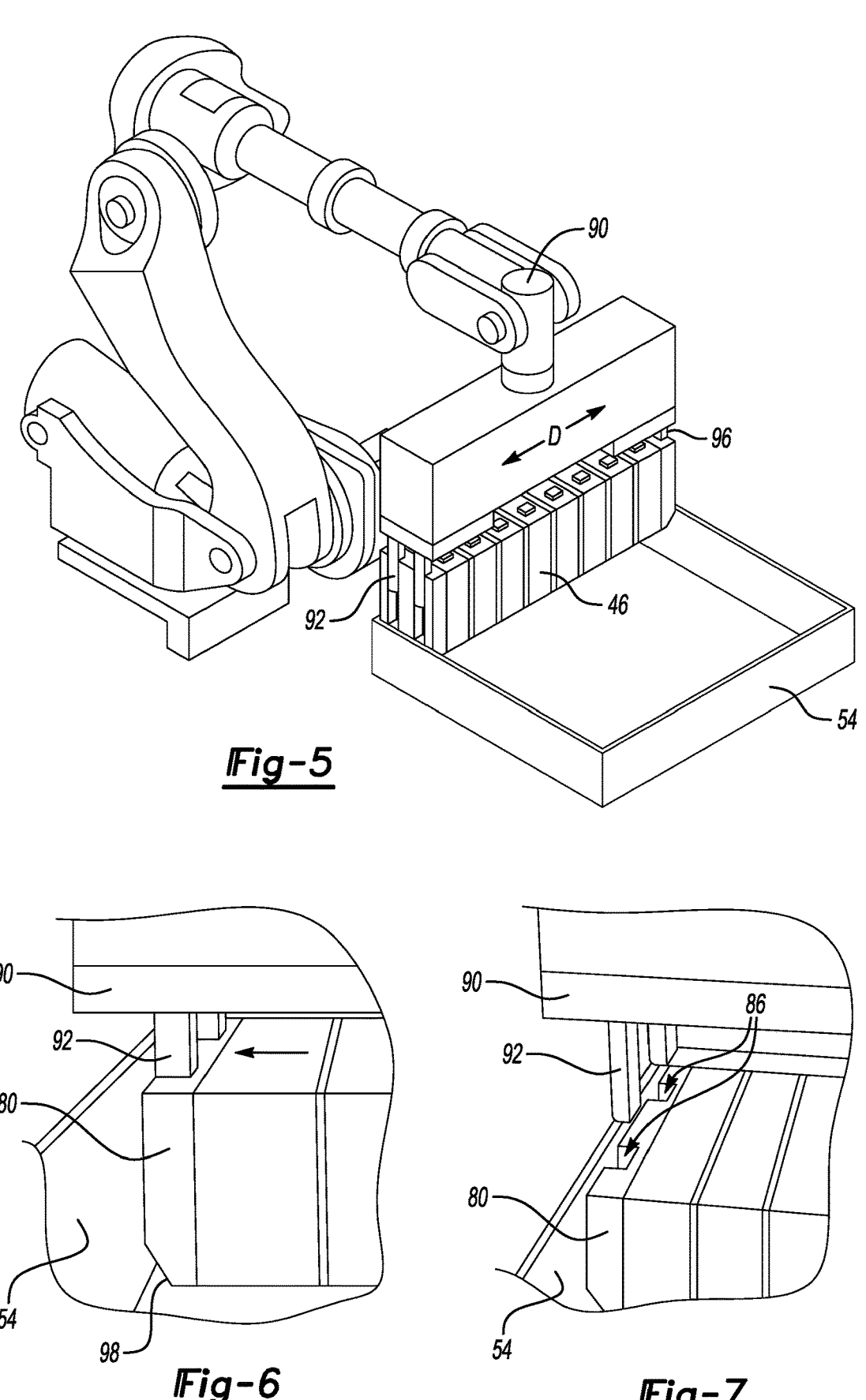
FIG. 5 illustrates a perspective view of a compressing machine engaged with and loading the cell stack of FIG. 4 into an enclosure structure of the traction battery pack.
FIG. 6 illustrates a close-up view of an area of FIG. 5 showing the compressing machine engaging the cell stack.
FIG. 7 illustrates the area of FIG. 6 after the compressing machine has disengaged from the cell stack.

This disclosure details example traction battery pack assemblies having an enclosure that provides an interior area. Battery cells and electronic modules can be held within the interior area along with other components. The battery cells can be used to power an electric machine.

In particular, this disclosure details an exemplary systems and methods relating to assembling traction battery pack assemblies.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

With reference now to FIG. 2, the traction battery pack assembly 14 includes a plurality of battery cells 30 held within an enclosure assembly 34. In the exemplary embodiment, the enclosure assembly 34 comprises various enclosure structures. In particular, the example enclosure assembly 34 includes an enclosure cover 38, an enclosure halo 40, and an enclosure floor 42. The enclosure cover 38, enclosure halo 40, and enclosure floor 42 are secured together to provide an interior area 44 that houses the plurality of battery cells 30.

The plurality of battery cells (or simply, "cells") 30 are for supplying electrical power to various components of the electrified vehicle 10. The battery cells 30 are stacked side-by-side relative to one another to construct one of a plurality of cell stacks 46, which are positioned side-by-side to provide a cell matrix 50. In this example, each cell stack 46 includes eight individual battery cells 30, and the cell matrix 50 includes four cell stacks 46.

Although a specific number of battery cells 30 and cell stacks 46 are illustrated in the various embodiments of this disclosure, the traction battery pack assembly 14 could include any number of cells 30 and cell stacks 46. In some examples, using an even quantity of battery cells 30 and an even quantity of cell stacks 46 can help to support and efficient electrical bussing arrangement. In other words, this disclosure is not limited to the specific configuration of cells 30 shown in FIG. 2.

In an embodiment, the battery cells 30 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure halo 40 and enclosure floor 42 are, in this example, parts of an enclosure tray 54. In particular, the enclosure halo 40 is provided by a plurality of side walls 56 of the enclosure tray 54. The side walls 56 are arranged relative to one another to provide a cell-receiving opening 60. The side walls 56 can be extruded, roll formed, cast, molded or other structures connected together by welding, fastening, or bonding, for example. The side walls 56 can extend vertically upward from the enclosure floor 42.

When the traction battery pack assembly 14 is assembled, the enclosure cover 38 can be secured to vertically upper side 62 of the enclosure halo 40. An interface between the enclosure cover 38 and the enclosure halo 40 extends circumferentially continuously about the interior area 44. Mechanical fasteners or welds, for example, can be used to secure the enclosure cover 38 and the enclosure halo 40. Vertical, for purposes of this disclosure, is with reference to ground and a general orientation of the electrified vehicle 10 during operation.

When the traction battery pack assembly 14 is assembled, the cell matrix 50 is positioned within the cell-receiving opening 60. The example enclosure halo 40 includes one cell-receiving opening 60, but it should be understood that this disclosure also extends to enclosure assemblies providing more than one cell-receiving opening. The enclosure cover 38 can cover the cell matrix 50 within the cell-receiving opening 60 to substantially surround the cells 30 from all sides.

The enclosure halo 40 compresses and holds the cell matrix 50 when the cell matrix 50 is inserted into the cell-receiving opening 60 of the enclosure halo 40. In this example, the side walls 56 of the enclosure halo 40 apply forces to the cell matrix 50 when the cell matrix 50 is positioned within the cell-receiving opening 60.

The traction battery pack assembly 14 can be considered a cell-to-pack battery assembly. Unlike conventional traction battery pack battery assemblies, a cell-to-pack battery assembly incorporates battery cells or other energy storage devices into the enclosure assembly 34 without the cells being arranged in arrays or modules. The enclosure assembly 34 applies compressive forces to the cells. The cell-to-pack battery assembly may therefore eliminate most, if not all, of the array support structures used in conventional battery arrays (e.g., array frames, spacers, rails, walls, end-plates, bindings, etc.) that are used to group and hold the battery cells within the arrays/modules.

The cell matrix 50 comprises a plurality of separate cell stacks 46, which can be separately inserted into the cell-receiving opening of the enclosure halo 40. To insert the example cells stacks 46, the cell stacks 46 are, while compressed, moved into place in the cell-receiving opening 60. Spacers may be used to maintain spacing between the different cell stacks 46.

An exemplary method of assembling the traction battery pack assembly 14 will now be explained in connection with FIGS. 3-8.

First, a group of cells 30 is compressed along a cell stack axis A as shown in FIG. 3 to provide one of the cell stacks 46. A compression fixture could be used to compress the cells 30 for example. The compressive force exerted on the cells 30 can be 3 kilonewtons in some examples. A pneumatic actuator, for example, could drive the compression fixture to compress the cells 30 along the cell stack axis A.

In this example, within the cells stacks 46, separator plates 72 are disposed between each of the cells 30 along the cell stack axis A. The separator plates 72 can include a frame portion 74 that holds a compressible material 76. The compressible material 76 can compress to permit some expansion of the cells 30 when installed with the traction battery pack assembly 14. The compressible material 76 can be foam.

Opposing axial ends of each of the cell stacks 46 includes load plates 80. The load plates 80 include a frame portion 82 that holds a compressible material 84. The compressible material 76 can be foam. The compressible material 84 can compress to permit some expansion of the cells 30. The load plates 80 also each include at least one cell stack slot 86, which will be utilized when assembling the cell stacks 46 into the enclosure halo 40. In some examples, the load plates 80 omit the compressible material 84.

Next, as shown in FIG. 5, the cell stack 46 is grasped by a compression machine 90, which maintains the compression of the cell stack 46. In some examples, the compression machine 90 is responsible for compressing the group of cells 30 to provide the cell stack 46. In other examples, the compression machine 90 grasps the cell stack 46 that was already compressed by a compression fixture, for example.

The example compression machine 90 is a 7-axis device, but other types of compression and insertion machinery could be used. The example compression machine includes a pair of first prongs 92 and a pair of second prongs 96. While two first prongs 92 and two second prongs 96 are shown in this example, other examples could include one first prong and one second prong, or more than two first prongs and second prongs.

The compression machine 90 can move the first prongs 92 and the second prongs 96 back-and-forth relative to each other along an axis D to selectively increase or decrease a distance between the first prongs 92 and the second prongs 96.

To hold the cell stack 46, the first prongs 92 and the second prongs 96 are each placed alongside a respective one of the load plates 80. The first prongs 92 and the second prongs 96 are then moved closer together to engage the respective one of the load plates 80. The first prongs 92 are each moved into one of the cell stack slots 86 on one of the load plates 80. The second prongs 96 are each moved into one of the cell stack slots 86 on the other of the load plates 80. Moving the first prongs 92 and the second prongs 96 into cell stack slots 86 engages the compression machine 90 with the load plates 80. Positioning the first prongs 92 and the second prongs 96 within cell stack slots 86 also facilitates repeatable alignment of the cell stack 46 relative to the compression machine 90.

The compression machine 90 then moves to align the cell stack 46 for insertion into the cell-receiving opening 60 of to the tray 54. Once aligned, the compression machine 90 moves to insert the cell stack 46 into the cell-receiving opening 60 of the tray 54 until the cell stack 46 is in the position of FIG. 6. The cell stack 46 is inserted into the tray 54 in a direction that is perpendicular to the axis A. A leading edge 98 of the load plates 80 can be angled or chamfered to help guide the insertion of the cell stack 46 by the compression machine 90 into the cell-receiving opening 60.

After the cell stack 46 is positioned within the tray 54, the first prongs 92 and the second prongs 96 are then moved away from each other. This disengages the compression machine 90 from the cell stack 46. Compression on the cell stack 46 is then maintained by the walls 56 of the tray 54. The example load plates 80 are directly contacting the walls 56 of the tray 54 when installed.

With the first prongs 92 and second prongs 96 disengaged from the cell stack 46, the compression machine 90 can withdraw the first prongs 92 and the second prongs 96 from the respective cell stack slots 86 as shown in FIG. 7. The compression machine 90 can then move to engage the load plates of another cell stack 46 and load that cell stack 46 into the enclosure tray 54.

In some examples, an adhesive can be introduced by injection into the cell stacks slots 86 after disengaging the compression machine 90. The adhesive can help to hold a position of the cell stack 46 within the tray 54.

The cover 38 can be secured to the tray 54 after the cell stacks 46 and other components are positioned within the tray 54. The traction battery pack assembly 14 can then be installed into the electrified vehicle 10 of FIG. 1.

Figures 8, 9:
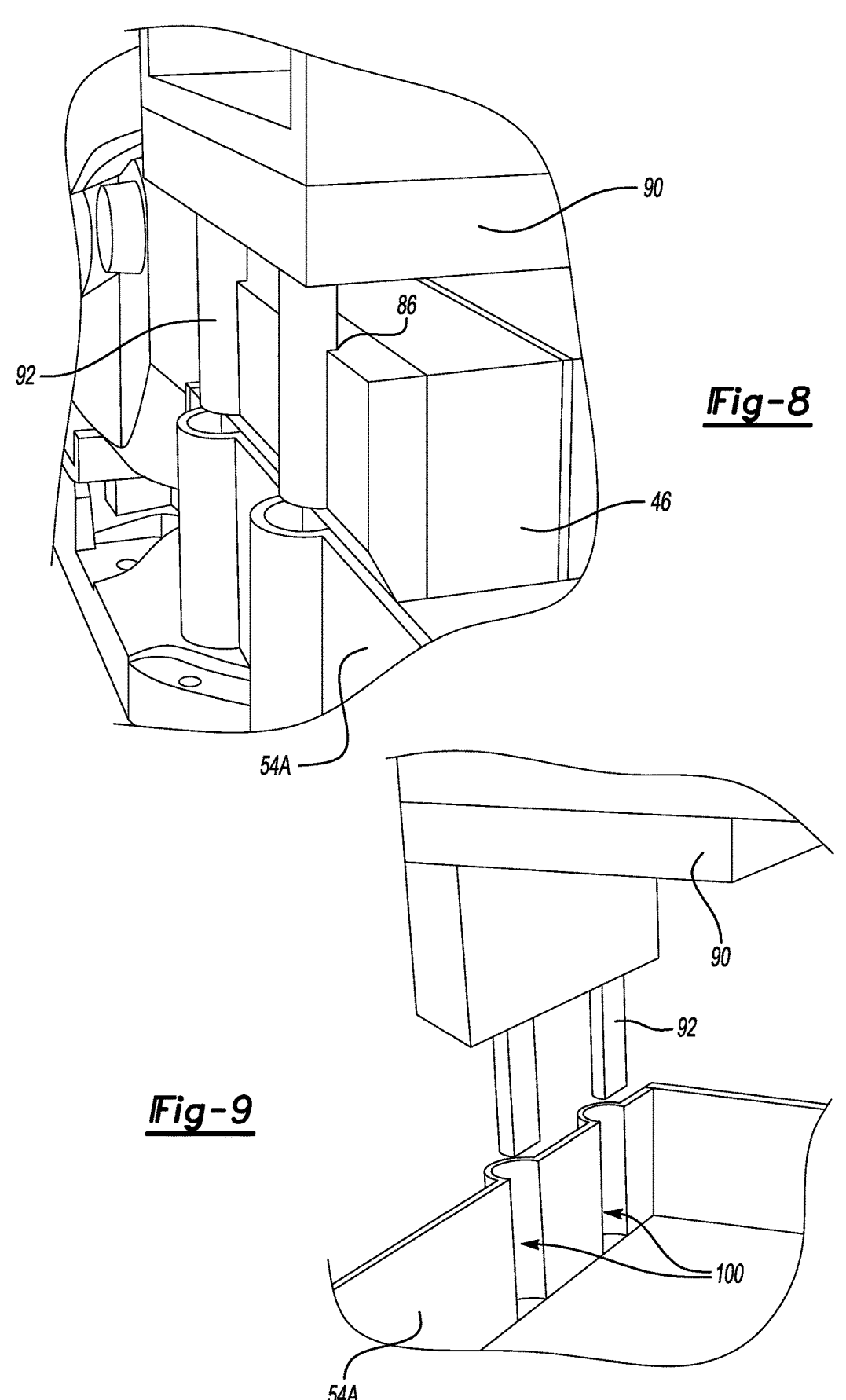
FIG. 8 illustrates a close-up perspective view of the compressing machine loading the cell stack of FIG. 8 into an enclosure structure according to another exemplary embodiment of the present disclosure.
FIG. 9 illustrates another close-up view of the embodiment of FIG. 8 with the cell stack removed to show clearance grooves of the enclosure.

With reference to FIGS. 8 and 9, in another exemplary embodiment can include a tray 54a having clearance grooves 100 in the side walls 56. The clearance grooves 100 can, in some examples, at least partially receive the first prongs 92 or second prongs 96 when the compression machine 90 is inserting the cell stack 46. This can act as a locator feature helping to align the cell stack 46 and the tray 54 during insertion.

The clearance grooves 100 also provide clearance for the first prongs 92 or the second prongs 96 to move outward away from the cell stack 46 when the compression machine 90 disengages from the cell stack 46. Like the cell stack slots 86, an adhesive can be introduced to the clearance grooves 100 after disengaging the compression machine 90 from the cell stack 46 and withdrawing the first prongs 92 and the second prongs 96 from the tray 54.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack assembly method, comprising:
   holding a cell stack with a compression machine, the cell stack including a plurality of battery cells disposed along a cell stack axis, the compression machine engaging a first load plate at a first axial end of the cell stack and a second load plate at an opposite, second axial end of the cell stack during the holding;
   aligning the cell stack relative to an enclosure structure while the compression machine holds the cell stack;
   inserting the cell stack into a cell-receiving opening of the enclosure structure; and
   disengaging the compression machine from the first load plate and the second load plate, the enclosure structure maintaining compression on the cell stack after disengaging the compression machine, wherein the compressing machine engages the first load plate through at least one first prong received within a cell stack slot of the first load plate, and engages the second load plate through at least one second prong received within a cell stack slot of the second load plate, wherein the enclosure structure includes at least one first clearance groove and at least one second clearance groove, the at least one first clearance groove receiving the at least one first prong along the cell stack axis during the disengaging, the at least one second clearance groove receiving the at least one second prong along the cell stack axis during the disengaging.

2. The method of claim 1, wherein the at least one first prong includes at least two first prongs, each first prong received within a respective slot of the first load plate, wherein the at least one second prong includes at least two second prongs, each second prong received within a respective slot of the second load plate.

3. The method of claim 1 further comprising disengaging by moving the at least one first prong and the at least one second prong away from each other into the respective at least one first clearance groove or at least one second clearance groove.

4. The method of claim 3, further comprising withdrawing the at least one first prong from the at least one first clearance groove, withdrawing the at least one second prong from the at least one second clearance groove, and then introducing an adhesive into the at least one first clearance groove and into the at least one second clearance groove.

5. The method of claim 1, wherein the cell stack is compressed along the cell stack axis during the holding.

6. The method of claim 5, wherein the inserting moves the first cell stack relative to the enclosure structure in a direction that is perpendicular to the cell stack axis.

7. The method of claim 1, wherein the enclosure structure circumferentially surrounds the cell stack after the inserting.

8. The method of claim 1, wherein the enclosure structure is an enclosure halo.

9. The method of claim 1, wherein the enclosure structure directly contacts the first load plate and the second load plate.

10. The method of claim 1 wherein the cell stack slot of the first load plate opens in a first direction along the cell stack axis and the cell stack slot of the second load plate open in an opposite second direction along the cell stack axis.

11. The method of claim 1, wherein the at least one first clearance groove and the at least one second clearance groove are formed in the enclosure structure.

12. The method of claim 1, wherein, during insertion, no portion of the first load plate is axially between the at least one first prong of the compression machine and the enclosure structure on the first axial end of the cell stack, and no portion of the second load plate is axially between the at least one second prong of the compression machine and the enclosure structure on the second axial end of the cell stack.

13. The method of claim 1, wherein, during the disengaging the at least one first prong extends axially beyond the first load plate and enters at least one first clearance groove of the enclosure structure, wherein, during the disengaging, the at least one second prong extends axially beyond the second load plate and enters at least one second clearance groove of the enclosure structure.

* * * * *